United States Patent [19]

McHale et al.

[11] Patent Number: 5,681,997

[45] Date of Patent: Oct. 28, 1997

[54] EXCITATION OF POLYSILICON BASED PIEZORESISTIVE PRESSURE SENSORS

[75] Inventors: Edward J. McHale, Medfield; Clifford D. Fung, Mansfield, both of Mass.

[73] Assignee: The Foxboro Company, Foxboro, Mass.

[21] Appl. No.: 734,088

[22] Filed: Jun. 19, 1996

Related U.S. Application Data

[63] Continuation of Ser. No. 359,962, Dec. 20, 1994, abandoned.

[51] Int. Cl.$^6$ .................................................. G01L 9/06
[52] U.S. Cl. ........................... 73/727; 73/726; 73/721; 338/42
[58] Field of Search ..................... 338/42; 73/720, 73/721, 726, 727, 514.33, 862.045, 862.338

[56] References Cited

U.S. PATENT DOCUMENTS

| | | | |
|---|---|---|---|
| 4,233,848 | 11/1980 | Sato et al. | 73/727 |
| 4,659,235 | 4/1987 | Gilmore et al. | 374/143 |
| 4,672,354 | 6/1987 | Kurtz et al. | 338/42 X |
| 4,765,188 | 8/1988 | Krechmery et al. | 73/727 |
| 4,853,669 | 8/1989 | Guckel et al. | 338/4 |
| 4,966,034 | 10/1990 | Bock et al. | 73/146.5 |
| 5,209,118 | 5/1993 | Jerman | 73/727 X |
| 5,220,838 | 6/1993 | Fung et al. | 73/727 X |
| 5,351,549 | 10/1994 | Baum et al. | 73/726 X |

FOREIGN PATENT DOCUMENTS

| | | |
|---|---|---|
| 0139370 | 5/1985 | European Pat. Off. . |
| 0482487 | 4/1992 | European Pat. Off. . |
| 0590292 | 4/1994 | European Pat. Off. . |
| WO9409376 | 4/1994 | WIPO ............ G01R 27/14 |

*Primary Examiner*—Richard Chilcot
*Assistant Examiner*—Joseph L. Felber
*Attorney, Agent, or Firm*—David Barron; Jules Jay Morris; Terrence Martin

[57] ABSTRACT

A polycrystalline pressure sensor is formed by depositing polycrystalline silicon piezoresistors on a polycrystalline sensing diaphragm. The piezoresistors are arranged in a wheatstone bridge configuration. During operation, an alternating differential signal is applied across the input of the wheatstone bridge. A measured voltage difference between the output terminals of the wheatstone bridge is used to detect imbalance in the electrical piezoresistors that corresponds to pressure applied to the sensor. Pressure is thereby measured.

24 Claims, 5 Drawing Sheets

EXCITATION OF POLYSILICON BASED PIEZORESISTIVE PRESSURE SENSORS

This application is a continuation of application Ser. No. 08/359,962, filed Dec. 20, 1994, now abandoned.

BACKGROUND

1. Technical Field

This invention relates to industrial process control instrumentation, more particularly, to circuitry relating to semiconductor pressure sensors.

2. Background Art

Piezoresistive pressure sensors are well-known in industrial instrumentation and have a large range of applications where accurate pressure monitoring is required. Examples of such industrial applications include process monitoring, rotating machinery monitoring and testing, oil exploration, jet engine and gas turbine controls, and the like. Piezoresistive pressure sensors have such a wide spread application since they offer many potential advantages due to their small size, absence of moving parts, and potential for sensitivity and accuracy.

Typically, these sensors consist of a diaphragm having one or more piezoresistive elements mounted thereon. Deflection of the diaphragm is generally detected by sensing elements such as piezoresistive elements placed on the edges of the diaphragm A voltage is placed across the piezoresistive elements and as the diaphragm bends in response to pressure changes, a resistance change in the resistive elements results in a change in the current flowing through the resistive elements and/or the distribution of voltages across the elements. This resistance change is directly proportional to the process pressure and is used as a measurement for it.

The prior art teaches of a single crystalline silicon strain gauges which are p-type doped regions located on an n-type silicon diaphragm. The strain gauges are typically p-n junction isolated piezoresistive elements. This type of sensor construction provides the benefits of solid state construction and high sensitivity. The piezoresistors are electrically powered by an application of a constant DC current or voltage source. DC techniques are used in the silicon-on-silicon sensors due to its ease of implementation and due to the incompatibility of the p-n junction isolated piezoresistors to bipolar AC excitation.

Nevertheless, them are disadvantages with the silicon-on-silicon sensors in certain applications which have led to the development of semiconductor sensors utilizing polycrystalline silicon diaphragms with polycrystalline silicon piezoresistor sensing elements. Single crystalline silicon and polycrystalline silicon materials have different properties which influence the mechanical strength, sensitivity, and manufacturability of the sensor. The use of polycrystalline silicon materials has the advantage of better manufacturability which improves the overall sensor performance, long term stability, and extends operability to higher temperatures.

However, polycrystalline silicon sensors can be subject to an extended period of transient behavior when electrically activated using the DC techniques employed with the silicon-on-silicon sensors. Experimental results have shown that this transient behavior can occur for several hours before the sensor reaches a steady state. Such a large transient behavior or stabilization period is detrimental to the overall performance of the sensor and to the accuracy of the sensor during the initialization period.

Therefore, it is an object of this invention to provide a means for reducing the stabilization period of a polycrystalline silicon piezoresistive sensor upon electrical activation.

It is a further object of this invention to provide a micro-powered excitation circuitry for piezoresistive sensing elements utilizing polycrystalline silicon diaphragms.

Yet a further object of this invention is to provide an extremely low power detection circuit for polycrystalline silicon sensors that responds to resistive changes in the sensing element immediately upon initial application of power with a very high degree of accuracy.

Other general and specific objects of this invention will be apparent and evident from the accompanying drawings and the following description.

SUMMARY OF THE INVENTION

This invention results from the realization that polycrystalline silicon sensing piezoresistors utilizing polycrystalline silicon diaphragms experience long-term transient behavior upon electrical excitation. It is the object of this invention to eliminate this long-term behavior and produce an apparatus and method for providing electrical excitation with a minimal stabilization period and utilizing micro-power consumption.

This invention features a polycrystalline silicon sensor for detecting the pressure of a process flow. The sensor consists of polycrystalline silicon piezoresistors deposited onto a polycrystalline silicon sensing diaphragm having a dielectric layer interposed in between. The piezoresistors can be arranged in a Wheatstone bridge configuration. Electrical excitation of the piezoresistors is accomplished by an alternating electrical waveform having a constant amplitude of less than 10 volts and at a frequency of less than 100 k Hz. The waveform is applied to a first input terminal of the Wheatstone bridge and the same waveform with an opposite polarity is applied to a second input terminal of the bridge. The resultant voltage difference between the output terminals is used to detect an imbalance in the electrical resistors induced by the pressure applied. The voltage level and frequency range chosen is such that the circuit utilizes approximately 1 mW of power. Additionally, the circuit produces a minimal transient behavior upon circuit activation.

BRIEF DESCRIPTION OF THE DRAWINGS

The foregoing and other objects, features and advantages of the invention will be apparent from the following more particular description of the preferred embodiment of the invention, as illustrated in the accompanying drawings in which like reference characters refer to the same elements throughout the different views. The drawings are not drawn to scale, emphasis being placed on illustrating the principles of the invention.

DESCRIPTION OF THE ILLUSTRATED EMBODIMENT

For this application, the terms polysilicon and polycrystalline silicon will be used interchangeably; the terms silicon and single crystalline silicon will be used interchangeably; and the terms piezoresistor strain gauges, piezoresistor elements, and piezoresistors are used interchangeably.

The present invention results from the realization that short-term initialization of polysilicon piezoresistors can be achieved through the use of bipolar AC excitation of the piezoresistors.

An application of the present invention is particularly well-suited for polysilicon piezoresistors used in sensing the pressure of a process flow. However, it should be understood that the present invention is applicable to other applications. The pressure sensed can be differential pressure, static or absolute pressure, and the term relative pressure or pressure will be used to denote these three types.

In the preferred embodiment of the invention, polysilicon piezoresistors can be used for sensing pressure. They can be deposited onto a polysilicon diaphragm which deflects due to applied pressure. Additionally, a dielectric layer can be interposed between the piezoresistors and the diaphragm. This electrically isolates the resistors minimizing both unwanted leakage currents and resistance degradation at high process fluid temperatures. The deflection of the diaphragm by the process pressure causes a change in stress which is detected by the piezoresistors. The resulting imbalance in the piezoresistors is proportional to the process pressure and a corresponding electric output signal is generated.

Figure 2:
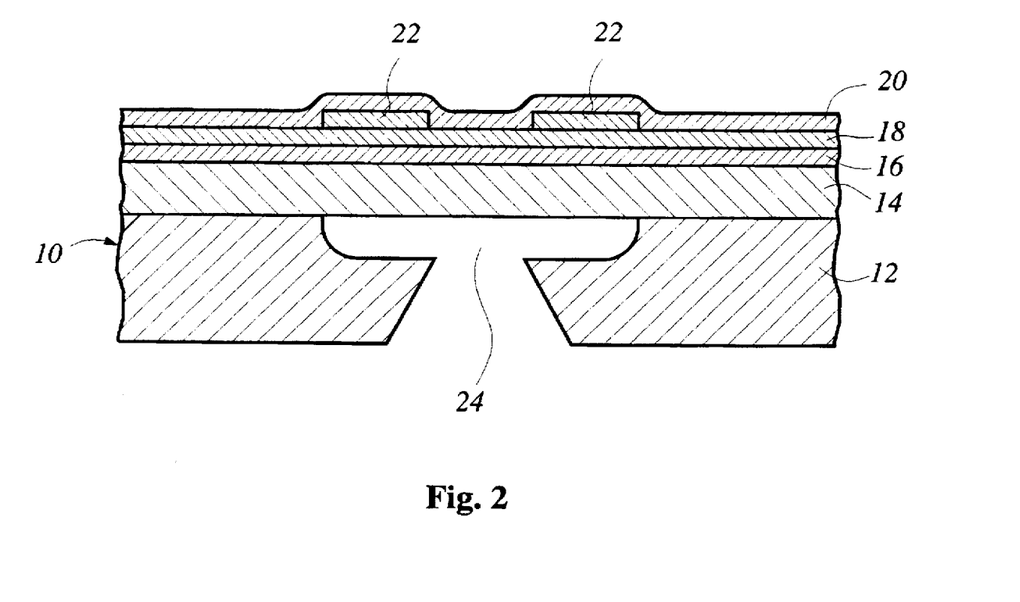
FIG. 2 is a cross-sectional view of the pressure sensor in accordance with the present invention.

FIG. 2 is a cross-sectional view of the pressure sensor utilized in accordance with the preferred embodiment of the invention. It illustrates the semiconductor materials which can be used in the fabrication of the sensor. The base of sensor 10 can consist of a single crystalline silicon substrate 12 having a cavity 24. A layer of low-stress low-pressure chemical vapor deposited (LPCVD) polysilicon 14, approximately 2 micrometers thick, can be deposited on substrate 12. Layer 14 serves as the sensing diaphragm. Layers 16 and 18 are deposited onto layer 14 forming a composite dielectric isolation layer. Layer 16 is deposited onto layer 14 and can be a 500 angstroms thick layer of silicon dioxide. Layer 18, a layer of LPCVD silicon nitride, approximately 900 angstroms thick, can be deposited onto layer 16. Layers 16 and 18 form a composite dielectric isolation upon which the resistors will be placed. These layers serve to isolate the resistors minimizing both unwanted leakage currents and resistance degradation at high process fluid temperatures. Layer 22 is the sensing resistor material which can be deposited through LPCVD polysilicon deposition onto the dielectric isolation layer 18. Layer 20 can be a layer of LPCVD silicon nitrate deposited over the sensing resistors 22 and layer 18, and serves as a passivation layer.

Cavity 24 is positioned on the reverse side of sensing diaphragm 14. It is vacuum filled when used to measure absolute pressure and vented to the atmosphere for a gauge pressure measurement. When a differential pressure measurement is warranted, different pressures are applied across sensing diaphragm 14.

Figure 3:
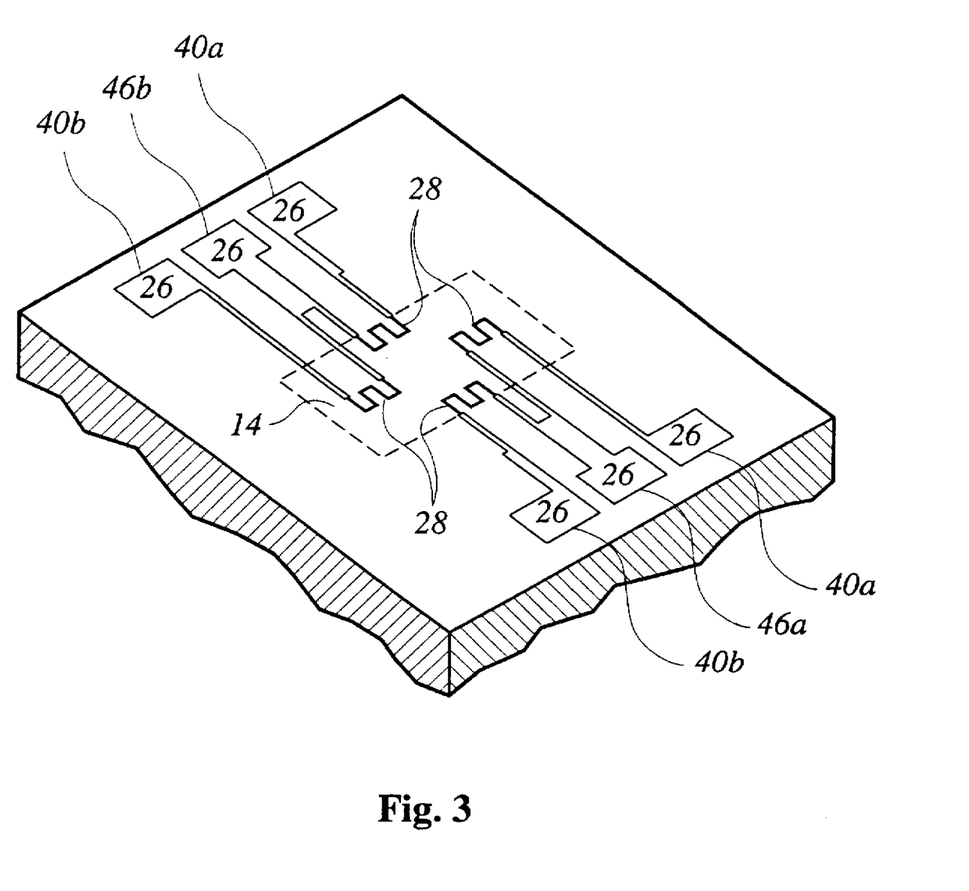
FIG. 3 is a top view of the pressure sensor and electrical contacts devised in accordance with the preferred embodiment of the invention.

Sensing diaphragm 14 senses the relative pressure of the process flow and produces a corresponding electrical signal. Sensing circuitry can be disposed on the diaphragm with a dielectric layer interposed between. The sensing circuitry can consist of four piezoresistors formed from layer 22 positioned symmetrically about the diaphragm center and connected in series to provide the highest pressure sensitivity and the best matching of resistors from diaphragm to diaphragm. Metalized pads 26 are connected to the ends of the piezoresistors 22 for providing external electrical connection, and to transmit the electrical signal produced by the piezoresistors to further signal processing circuitry (not shown).

Figure 1:
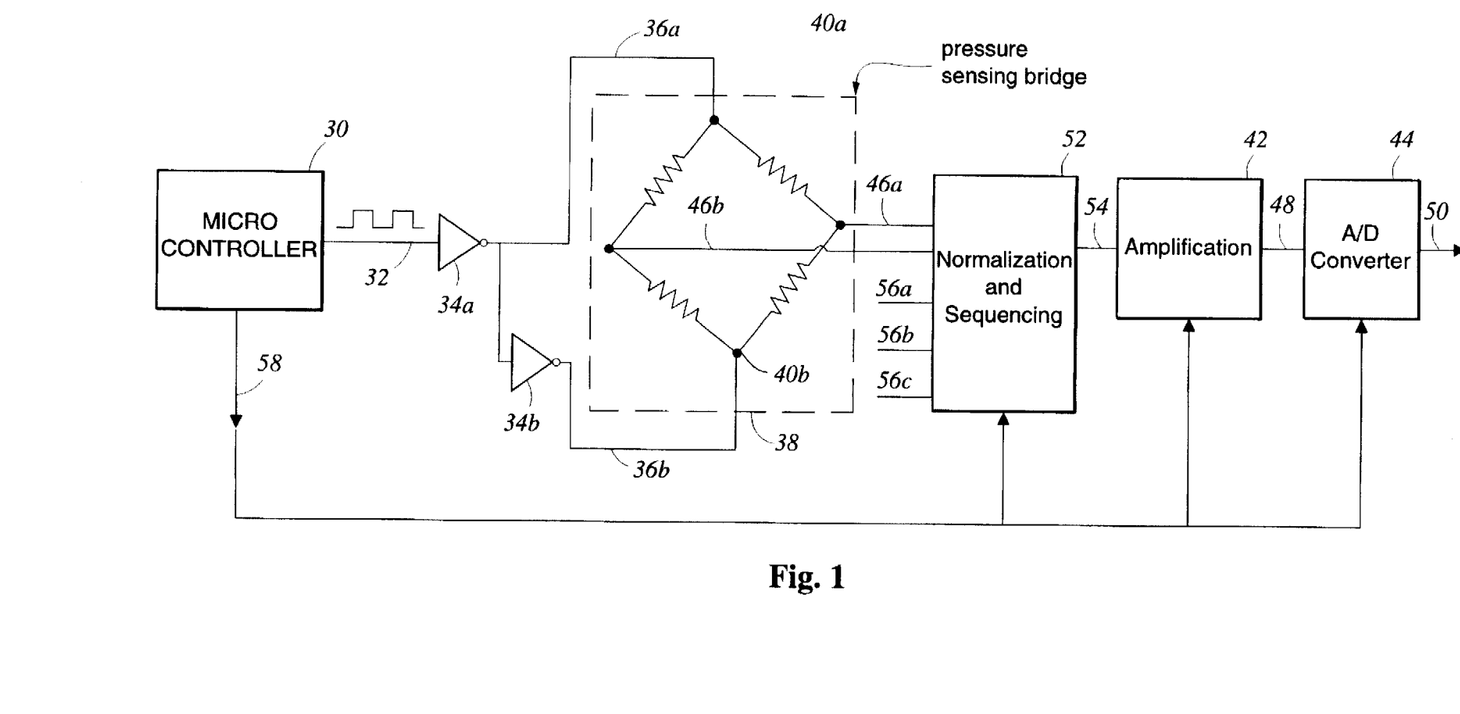
FIG. 1 is a circuit diagram of the excitation voltage and sensing circuitry for the pressure sensor in accordance with the preferred embodiment of the invention.

The circuitry which performs the excitation of the sensor is illustrated in FIG. 1. Referring to FIG. 1, micro-controller 30 produces a AC waveform 32 which is applied to electrically powered pressure sensing bridge 38. Once powered, pressure sensing bridge 38 responds to the pressure applied to it thereby generating signal 46a & 46b representing a measurement of it. The bridge output signal 46a & 46b can then be transmitted to a normalization and sequence circuit 52. Circuit 52 normalizes the bridge output signal as well as sequences all the various electrical signals 56a, 56b & 56c generated within the sensor. Bridge output signal 46a & 46b can be normalized by comparing signals 46a, 46b to an output of a similarly excited reference voltage divider thereby essentially eliminating the effect of errors and drift in the conditioning and digitization circuitry. The resulting normalized signal and all other electronic signals 56a, 56b & 56c generated within the sensor are sequenced. Examples of such signals can be calibration signals used for calibrating the A/D converter, and temperature signals indicating the process fluid temperature as well as the circuitry temperature. This sequencing minimizes the effects of amplifier and sensor noise while maintaining adequate speed of response to changes in the input pressure as well as environmental influences such as ambient temperature.

The resulting normalized signal 54 can then be amplified at amplification stage 42 producing signal 48. Amplified signal 48 can be transmitted to an analog-to-digital converter 44 to produce an equivalent digital signal 50 of the pressure measurement signal, 46a & 46b. Digital signal 50 can then be transmitted to other signal processing circuitry for further signal conditioning and processing. Normalization and sequencing circuit 52, amplication circuit 42, and A/D converter 44 are all under the control of micro-controller 30.

Voltage excitation can be utilized with a clock-pulse voltage signal 32 providing bipolar AC excitation. The clock-pulse voltage signal 32 can be generated from a micro-controller 30. However, this invention is not limited to voltage excitation. Bipolar current excitation methods can be used as well. Voltage signal 32 can be a 50% duty-cycle square-wave pulse having an amplitude, Vex, of less than 10 volts, preferably 3 volts, and a frequency less than 100K Hz, preferably between 5–10 Hz. Inverter 34a applies excitation voltage, Vex, 36a, to the first input terminal, 40a, of sensing element, 38. Inverter 34b applies a similar voltage of opposite polarity, −Vex, 36b, to the second input terminal, 40b of sensing element, 38. The amplitude and frequency values are chosen to achieve micro-power consumption in the order of less than 10 mW. Low power consumption is crucial for industrial instruments since they need to adhere to industrial instrumentation intrinsic safety requirements such as the CENELEC Intrinsic Safety Standard for Electrical Apparatus for Potentially Explosive Atmospheres, EN50020. In the preferred embodiment, the circuit consumes approximately 1 mW of power which is advantageous since pressure devices of this type are generally powered by a two-wire circuit that supplies both the energy to operate the device and carries the data transmission.

Figure 5:
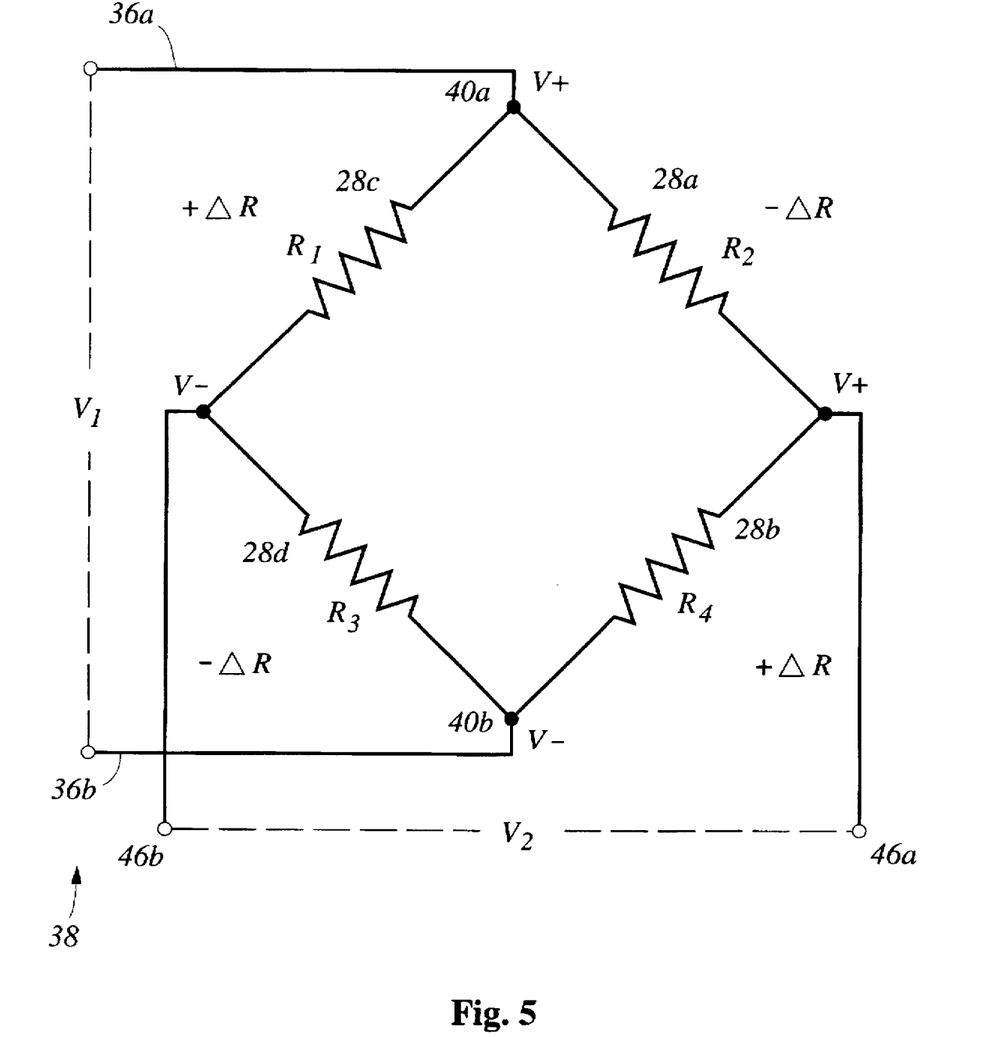
FIG. 5 is a schematic diagram of the coupling of the sensing resistors in a Wheatstone bridge configuration according to the present invention.

FIG. 5 illustrates the sensing circuitry that can be employed by pressure sensing bridge 38. Referring to FIG. 5, the sensing circuitry can consist of four piezoresistive elements positioned in a Wheatstone bridge configuration. Preferably, the Wheatstone bridge has two arms, one containing piezoresistors 28a and 28b connected in series and a second arm containing piezoresistors 28c and 28d connected in series. Both arms of the bridge are electrically connected with input terminals 40a and 40b. The four piezoresistors 28a, 28b, 28c, and 28d, are positioned on the sensing diaphragm such that when they are subject to movement of the sensing diaphragms due to pressure, piezoresistors 28b and 28c both experience either a compressive or a tensile strain while piezoresistors 28a and 28d simultaneously experience the opposite strain. Thus if pieozoresistors 28a and 28d are increasing in resistance, then piezoresistors 28c and 28d are decreasing in resistance. This in turn creates an imbalance across the bridge such that when a voltage is applied at input terminal 40a, a voltage, V2, occurs across terminals 46a, 46b which is related to the movement of the diaphragm relative to the pressure being sensed. Voltage V2 can be expressed mathematically in accord with the following mathematical relation:

$$V2 = \Delta_r V_{ex} + V_{int} \quad (1)$$

Vex is the excitation voltage,

Vint is an interference signal attributable to low-frequency or dc component noises, and Δr is the change in resistance ratio (i.e., unit or normalized resistance) across both arms of the Wheatstone bridge. The change in resistance ratio is the change in resistance of the wheatstone bridge divided by the initial resistance of the wheatstone bridge.

Figure 4:
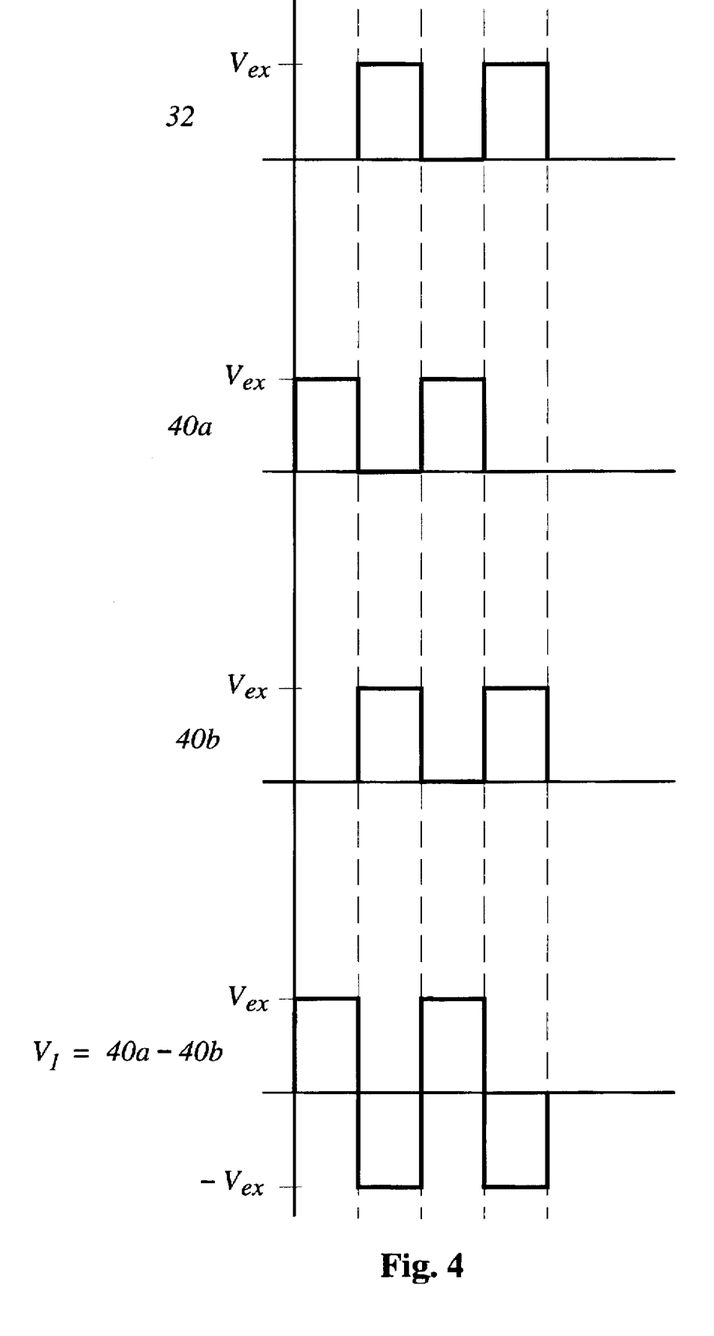
FIG. 4 illustrates the phasing of the voltage signals applied to the sensing elements in accordance with the invention.

The operation of the sensing circuitry will now be described in detail with reference to the timing diagrams in FIG. 4. Micro-controller 30 generates a clock-pulse voltage signal 32. Voltage signal 32 can be a 50% duty-cycle square-wave pulse having an amplitude, Vex, of less than 10 volts, preferably 3 volts, and a frequency less than 100K Hz, preferably between 5–10 Hz. A first voltage, Vex, 36a, is applied to input terminal 40a of sensing element 38 having an identical amplitude and frequency as clock-pulse signal 32. As pressure is applied to the sensing diaphragm, it deflects causing one of the piezoresistors on each arm of the bridge to increase in resistance while the other piezoresistors decreases in resistance. This imbalance across the bridge causes the voltage V2' to be related to the pressure sensed in accord with the following mathematical relation:

$$V2' = (\Delta r) V_{ex} + V_{int} \quad (2)$$

The measurement of V2' is made during the first half of the application of voltage 36a. For example, in the case where Vex is applied to input terminal 36a at a frequency of 10 Hz, the width of the clock-pulse voltage 40a is approximately 100 ms. For the first 50 ms, V2', 46, is measured. During the remaining 50 ms, the signal 46 is amplified by amplification stage 42. At the completion of the application of voltage 36a, the amplified signal 48 is transmitted to A/D converter 44 which generates an equivalent digital signal 50 which is then transmitted for further signal processing.

A second voltage, −Vex, 36b, is applied to input terminal 40b which is substantially similar to the first voltage but opposite in polarity. Likewise, as pressure is applied to the sensing diaphragm, it deflects causing the voltage V2" to be related to the pressure sensed in accord with the following mathematical relation:

$$V2" = (\Delta r)(-V_{ex}) + V_{int} \quad (3)$$

The measurement of V2" is made in the same fashion as V2'. During the first half of the application of voltage 36b, the measurement of V2" is made generating signal 46. During the second half of the application of voltage 36b, signal 46 is amplified for transmission to A/D converter 44. An equivalent digital signal 50 is generated from A/D converter 44 and transmitted to further electronic circuitry for additional signal processing.

The signal processing circuitry (not shown) may take the difference between these two measurements and eliminate the interference noise signal and produce a resultant resistance as follows:

$$\Delta_r = (V2' - V2")/(2V_{ex})$$

This resulting resistance ratio (Δr) is directly proportional to the pressure sensed and is used as a measurement for it.

The above described invention discloses an apparatus and method for providing micro-power excitation of polysilicon piezoresistor sensing elements that utilize a polysilicon diaphragm. The invention is beneficial since experimental results show that it prevents the long term transient behavior of polysilicon piezoresistors upon electrical activation. The voltage levels and the frequency ranges are chosen so that the circuit employs micro-power consumption of approximately 1 mW and minimal transient behavior upon activation.

As discussed above in regard to FIG. 4, the difference of the signals applied to the input terminals of the wheatstone bridge (40a, 40b) alternates between $V_{ex}$ and $-V_{ex}$. By way of further explantion, in regard to one embodiment of the present invention as shown in FIG. 4, each input of the wheatstone bridge alternates between a positive voltage ($V_{ex}$) and zero volts (when viewed from a single reference point). However, each input (40a, 40b) is 180 degrees out of phase from the other input. Therefore, when input 40a is at $V_{ex}$, input 40b is at zero volts, while when input 40b is at $V_{ex}$, input 40a is at zero volts. Each leg of the wheatstone bridge is therfore alternatively energized by a differential excitation source. Since each leg is energized with a positive voltage, while the other let is kept at a zero volt potential, a common zero volt reference point is maintained with reaspect to the normalization and sequencing circuitry (e.g., FIG. 1—element 52).

Although the preferred embodiment of the invention has been described hereinabove in detail, it is desired to emphasize that this is for the purpose of illustrating the invention and thereby to enable those sMIled in this art to adapt the invention to various different applications requiting modifications to the apparatus described hereinabove; thus, the specific details of the disclosures herein are not intended to be necessary limitations on the scope of the present invention other than as required by the prior art pertinent to this invention.

We claim:

1. A semiconductor sensor comprising:

a) an impedance circuit comprising at least one piezoresistor element formed on a semiconductor diaphragm to which a pressure to be detected is applied, said impedance circuit having a first input terminal and a second input terminal and first and second output terminal;

b) means for applying an alternating differential excitation source across said first input terminal and said second input terminal of said impedance circuit for electrically powering said at least one piezoresistor element; and c) means for measuring voltages across said output terminals when said excitation source is at alternate phases, and means for using said measured voltages to determine said pressure.

2. A sensor as in claim 1 wherein said impedance circuit is an impedance bridge having first and second arms, said first and second arms each comprising a first and second piezoresistors series-connected to each other and formed on a semiconductor diaphragm to which a pressure to be detected is applied, said first and second arms each having a first and second end and said first ends of the first and second arms being electrically connected to each other, said second ends of the first and second arms being electrically connected to each other.

3. A sensor as in claim 2 wherein the first piezoresistor of each of the first and the second arms of the impedance bridge has an impedance increasing in accordance with the increase of the applied pressure, and wherein the second piezoresistor of each of the first and the second arms of the impedance bridge has an impedance decreasing in accordance with the applied pressure.

4. A sensor as in claim 1 wherein said piezoresistor element comprises a polysilicon piezoresistor and wherein said semiconductor diaphragm comprises a polysilicon diaphragm.

5. A sensor as in claim 1 comprising a dielectric layer disposed between said piezoresistor element and said semiconductor diaphragm.

6. A sensor as in claim 5 wherein said dielectric layer comprises a layer of silicon nitride deposited onto a layer of silicon dioxide through low-pressure chemical vapor deposition.

7. A sensor as in claim 1 wherein said semiconductor diaphragm comprises a cavity coupled to the rear side of said semiconductor diaphragm for subjecting said semiconductor diaphragm to the pressure to be detected.

8. A sensor as in claim 1 wherein said means for applying an alternating differential excitation source comprises an alternating voltage generator applying a first voltage input to the first input terminal of said impedance circuit, and a second voltage input to the second input terminal of said impedance circuit, said second voltage input being similar to said first voltage input but out of phase therewith.

9. A sensor as in claim 1 wherein said means for applying an alternating differential excitation source comprises an alternating current generator applying a first current input to the first input terminal of said impedance circuit, and a second current input to the second input terminal of said impedance circuit, said second current input being similar to said first current input but out of phase therewith.

10. A sensor as in claim 8 wherein said alternating voltage generator applies a first voltage input comprising a constant amplitude of less than 10 volts and a frequency of less than 100 k Hz, and a second voltage input similar to said first voltage input in frequency.

11. A method for calculating the resistance of a polysilicon pressure sensor, the method comprising the steps of:
   a) applying a first differential voltage into the sensor, the first voltage having an alternating voltage waveform of an amplitude of less than 10 volts and a frequency of less than 100 k Hz;
   b) measuring a first voltage level across the sensor when the first voltage is present;
   c) applying a second differential voltage into the sensor, the second voltage being identical to the first voltage but out of phase therewith;
   d) measuring a second voltage level across the sensor when the second voltage is present; and
   e) calculating the resistance of the sensor as a function of the measured first voltage level and the measured second voltage level.

12. A semiconductor sensor comprising:
   a) a polysilicon sensing diaphragm for deflecting due to a pressure applied thereto;
   b) at least one polysilicon piezoresistor sensing element deposited onto said polysilicon sensing diaphragm for detecting the applied pressure, said at least one polysilicon piezoresistor sensing element having a first input terminal and a second input terminal and a pair of output terminals;
   c) a dielectric layer interposed between said polysilicon sensing diaphragm and said at least one polysilicon piezoresistor sensing element for providing electrical isolation;
   d) an excitation source connected across said first input terminal and said second input terminal for electrically powering said at least one polysilicon piezoresistor sensing element, said excitation source providing differential AC excitation; and
   e) a measuring circuit, synchronized with said excitation source, for measuring voltages across said output terminals during opposite phases of said excitation source.

13. A sensor as in claim 12 wherein said dielectric layer comprises a layer of silicon nitride deposited onto a layer of silicon dioxide through low-pressure chemical vapor deposition.

14. A sensor as in claim 12 wherein said polysilicon sensing diaphragm comprises a cavity coupled to the rear side of said polysilicon sensing diaphragm for subjecting said polysilicon sensing diaphragm to the pressure to be detected.

15. A sensor as in claim 12 wherein said excitation source applies a first voltage of an amplitude of less than 10 volts and a frequency of less than 100 k Hz to said first input terminal, and applies a second voltage similar to said first voltage, but out of phase therewith, to said second input terminal.

16. A sensor as in claim 12 wherein said excitation source comprises an alternating differential voltage generator applying a first voltage input to the first input terminal, and a second voltage input to the second input terminal, said second voltage input being similar to said first voltage input but out of phase therewith.

17. A sensor as in claim 12 wherein said excitation source comprises an alternating differential current generator applying a first current input to the first input terminal, and a second current input to the second input terminal, said second current input being similar to said first current input but out of phase therewith.

18. A sensor as in claim 16 wherein said first voltage input comprises an amplitude of less than 10 volts and a frequency of less than 100 k Hz.

19. A driving apparatus for operating a semiconductor sensor, said semiconductor sensor comprising at least one piezoresistor element and having a first input terminal and a second input terminal, said driving apparatus comprising:
   a first output, said first output electrically coupled to said first input terminal;
   a second output, said second output electrically coupled to said second input terminal; and
   a driver circuit electrically coupled to said first output and said second output, said driver circuit selectively operable to alternately engage one of a first voltage and a second voltage on said first output and the other of said first voltage and said second voltage on said second output, wherein said first voltage is different from said second voltage.

20. The circuit of claim 19, wherein said first voltage has a first magnitude and said second voltage has a second magnitude, said first magnitude being greater than said second magnitude.

21. The circuit of claim 20, wherein said second voltage comprises zero volts.

22. A method for operating a semiconductor sensor, said semiconductor sensor comprising at least one piezoresistor element and having a first input terminal and a second input terminal and an output, said method comprising:

(a) alternately engaging one of a first voltage and a second voltage on said first input terminal of said semiconductor sensor;

(b) alternately engaging the other of said first voltage and said second voltage on said second input terminal of said semiconductor sensor, wherein said first voltage is different from said second voltage; and (c) in synchronization with said steps (a) and (b), measuring voltages at said output.

23. The method of claim 22, wherein said first voltage has a first magnitude and second voltage has a second magnitude, said first magnitude being greater than said second magnitude.

24. The method of claim 23, wherein said second voltage comprises zero volts.

* * * * *